US012749301B2

(12) United States Patent
Yang et al.

(10) Patent No.: US 12,749,301 B2
(45) Date of Patent: Sep. 29, 2026

(54) CHIMNEY DETECTION METHOD BASED ON AI TECHNOLOGY

(71) Applicant: Institute of Atmospheric Physics, Chinese Academy of Sciences, Beijing (CN)

(72) Inventors: Ting Yang, Beijing (CN); Jun Lu, Beijing (CN); Yang Xu, Beijing (CN); Zifa Wang, Beijing (CN); Hongyi Li, Beijing (CN); Jiancun He, Beijing (CN)

(73) Assignee: INSTITUTE OF ATMOSPHERIC PHYSICS, CHINESE ACADEMY OF SCIENCES, Beijing (CN)

( * ) Notice: Subject to any disclaimer, the term of this patent is extended or adjusted under 35 U.S.C. 154(b) by 199 days.

(21) Appl. No.: 18/811,285

(22) Filed: Aug. 21, 2024

(65) Prior Publication Data

US 2025/0336194 A1 Oct. 30, 2025

(30) Foreign Application Priority Data

Apr. 30, 2024 (CN) ........................ 202410543694.7

(51) Int. Cl.
*G06V 10/82* (2022.01)
*G06T 7/11* (2017.01)
(Continued)

(52) U.S. Cl.
CPC ................ *G06V 10/82* (2022.01); *G06T 7/11* (2017.01); *G06V 10/454* (2022.01);
(Continued)

(58) Field of Classification Search
CPC ......... G06T 7/0014; G06T 2207/10016; G06T 2207/10081; G06T 2207/10088; G06T 2207/10116; G06T 2207/10132; G06T 2207/20212; G06T 2207/30048; G06T 2207/30101; A61B 5/055; A61B 5/7485; A61B 5/4887; A61B 5/0037;
(Continued)

(56) References Cited

U.S. PATENT DOCUMENTS

2024/0346308 A1* 10/2024 Okazaki ................ G06F 18/241
2024/0384871 A1* 11/2024 Harvey .................. G01K 3/005

OTHER PUBLICATIONS

Yao et al., "Chimney and Condensing Tower Detection Based on Faster R-CNN in High Resolution Remote Sensing Images", 2017. (Year: 2017).*

* cited by examiner

*Primary Examiner* — Phuoc Tran
(74) *Attorney, Agent, or Firm* — MUNCY, GEISSLER, OLDS & LOWE, P.C.

(57) ABSTRACT

A chimney detection method based on AI technology includes collecting a remote sensing chimney image dataset, divide it into a training set and a validation set, and enhance the data; inputting the dataset into the main network for feature extraction, and transmit it to the neck network to extract feature information; transmitting the feature information obtained by the neck network to the feature pyramid, performing up and down sampling for feature fusion, strengthening features through an explicit visual center and global attention mechanism, and obtaining the corresponding enhanced feature map; and inputting the enhanced feature map into the head network respectively, and obtain the detection result of the remote sensing chimney image.

10 Claims, 4 Drawing Sheets

(51) Int. Cl.
*G06V 10/44* (2022.01)
*G06V 10/774* (2022.01)
*G06V 20/13* (2022.01)
*G06V 20/70* (2022.01)

(52) U.S. Cl.
CPC ............ *G06V 10/774* (2022.01); *G06V 20/13* (2022.01); *G06V 20/70* (2022.01); *G06T 2207/20132* (2013.01)

(58) Field of Classification Search
CPC .... A61B 5/0044; A61B 5/7203; G06V 10/40; G06V 20/50; G06V 2201/031; G06V 2201/03
See application file for complete search history.

CHIMNEY DETECTION METHOD BASED ON AI TECHNOLOGY

CROSS REFERENCE TO RELATED APPLICATIONS

This application claims priority of Application No. 2024105436947 filed in China on Apr. 30, 2024 under 35 U.S.C. § 119, the entire contents of which are hereby incorporated by reference.

TECHNICAL FIELD

This invention relates to the field of image processing technology, especially to a chimney detection method based on AI technology.

BACKGROUND TECHNOLOGY

Industrial chimney emissions are one of the main sources of urban air pollution, and the quality of the urban environment is often inversely proportional to the number of chimneys. Therefore, chimney location detection is crucial for urban environmental monitoring and governance. Although in the past few years, object detection technology has been continuously advancing, and has achieved good detection results in some simple scenarios, there are still problems in the task of chimney detection, such as complex remote sensing image backgrounds, small targets, and a large number of similar objects that can reduce detection accuracy.

In existing technology, the most representative deep learning algorithms in the field of object detection include Region-based Convolution Neural Network (RCNN), Fast RCNN, Faster RCNN, and You Only Look Once (YOLO), etc. Among these algorithms, RCNN and its derivative algorithms belong to two-stage convolutional neural networks, which find possible target positions in the image through region proposal technology, and then use the features extracted from the feature layer for target classification. The advantage of this type of detector is high accuracy, but the real-time performance is low, which makes it difficult to meet the demand for rapid detection. On the other hand, YOLO is an end-to-end convolutional neural network based on regression problems, its real-time performance has been significantly improved, but its detection accuracy is not as good as two-step detectors such as Faster RCNN. Although these object detection models have performed well in their respective application fields, in the detection of remote sensing chimney images, due to problems such as complex backgrounds, small targets, and image quality effects, the detection accuracy is generally not ideal.

The difficulties of remote sensing image detection are mainly reflected in the following aspects: complexity and variability of the background, multi-scale nature of the target, and issues with image resolution and quality. These problems may become key factors restricting remote sensing image detection, usually causing detection models to easily produce false positives or false negatives when processing remote sensing images, and existing remote sensing image detection technology cannot guarantee detection accuracy and recognition accuracy at the same time. For example, the complexity and variability of the background and the diversity of target sizes make it difficult for traditional detection methods to accurately locate, and image resolution and quality issues may reduce the detection ability of the model.

SUMMARY OF THE INVENTION

In view of the defects in the existing technology, the purpose of this invention is to propose a chimney detection method based on AI technology, which can improve the detection effect of remote sensing chimney images, improve the Mean Average Precision (MAP) value while maintaining the detection speed, to solve the problem of poor detection effect of remote sensing chimney images proposed in the above background technology.

To achieve the above purpose, this invention is implemented through the following technology.

The present invention provides a chimney detection method based on AI technology, including:

Step S1: Collect a remote sensing chimney image dataset, divide it into a training set and a validation set, and perform data augmentation;

Step S2: Input the dataset into the backbone network for feature extraction, and transmit it to the neck network to extract feature information, the feature information includes spatial information and channel information;

Step S3: Transmit the feature information obtained from the neck network to the feature pyramid, perform up and down sampling for feature fusion, strengthen features through explicit visual center and global attention mechanism, and obtain the corresponding enhanced feature map;

Step S4: Input the enhanced feature map into the head network, use the four decoupled object detection heads included in the head network to perform object detection to obtain the corresponding predicted feature map, and output the final preselection box through non-maximum suppression to obtain the detection result of the remote sensing chimney image.

Further, step S1 includes collecting a remote sensing chimney image dataset, dividing it into a training set and a validation set, and performing data augmentation, specifically, obtaining remote sensing images of chimneys through satellite images to form the dataset, cropping each image and annotating the position and size of the chimney to generate corresponding picture labels; and dividing the collected and annotated dataset into the training set and the validation set at a ratio of 8:2.

Further, step S2 includes inputting the dataset into the backbone network for feature extraction, specifically, the backbone network receives the cropped and annotated remote sensing images as input and extracts features; convolving the remote sensing images and enhancing the features through a multi-layer convolution structure and an enhancement module, wherein the enhancement module is a combination module of Efficient Layer Aggregation Network (ELAN) and Max Pooling (MP); extracting the feature information from the corresponding level of the backbone network to generate feature maps of different sizes.

Further, step S2 includes transmitting the input of the collected data set into the backbone network for feature extraction, and the obtained feature information to the neck network to extract feature information, the feature information includes spatial information and channel information, specifically, input the feature maps of different sizes into the neck network; the neck network convolves the input feature maps and extracts the spatial information and the channel information therein.

Further, step S3 includes transmitting the feature information obtained from the neck network to the feature pyramid, performing up and down sampling for feature fusion, strengthening features through explicit visual center and global attention mechanism, and obtaining the corresponding enhanced feature map, specifically, inputting the feature maps of different sizes generated by the neck network into the feature pyramid network. The feature pyramid network performs upsampling on the feature maps of each size, where the explicit visual center and Stem Block enhance and smooth the top-level feature map. The explicit visual center includes a lightweight Multi-Layer Perceptron (MLP) module and an Local Visual Center (LVC) module. During the downsampling process, for the transmitted feature map, the method focuses on the key area through the global attention mechanism, and uses the MP module for feature fusion.

Further, the Stem Block enhances and smooths the top-level feature map, specifically, the top-level feature map undergoes a 7×7 convolution layer operation, the output after convolution goes through a batch normalization layer, and then goes through an activation function layer to enhance the non-linear processing capability.

Further, the feature pyramid network performs upsampling on the feature maps of each size. Specifically, the lightweight MLP module enhances the feature representation based on the output feature Xsb of the Stem Block through group normalization and deep convolution processing and through residual connection. The LVC module uses a combination of 1×1, 3×3, 1×1 convolutions to encode the feature Xsb, and enhances the feature through the Convolution-Batch Normalization-ReLU (CBR) block to obtain the corresponding relationship between the corresponding pixel point and position information; summarize the output feature maps of the MLP module and the LVC module along the channel dimension to connect, to get the final output of the explicit visual center.

Further, during the downsampling process, for the transmitted feature map, the method focuses on the key area through the global attention mechanism, and uses the MP module for feature fusion, specifically, the channel attention mechanism processes the input feature map F1, and concatenates it with the original feature map to form an intermediate state F2. The intermediate state F2 is processed through the spatial attention mechanism, the spatial information is enhanced through concatenation, and the final feature output F3 is obtained to enhance the recognition ability of local spatial details.

Further, step S4 includes inputting the enhanced feature map into the head network, using the four decoupled object detection heads included in the head network to perform object detection to obtain the corresponding predicted feature map, specifically, setting and applying four decoupled object detection heads in the head network, and the decoupled object detection heads correspond to the enhanced feature maps of different sizes. The four decoupled object detection heads perform multi-size prediction on the enhanced feature maps of different levels, generate the predicted feature map and output the prediction information containing the offset of the center coordinates, width, height, bounding box confidence, and category confidence.

Further, step S4 includes outputting the final preselection box through non-maximum suppression to get the detection result of the remote sensing chimney image, specifically, filtering out bounding boxes with confidence lower than the threshold, optimizing the selection of the bounding box by calculating the intersection over union IoU and adjusting the confidence of the bounding box; sorting and traversing the optimized bounding boxes according to confidence, reducing the confidence of the overlapping bounding boxes, and adjusting the coordinates of the bounding box back to the original image size and output the final detection result.

Compared with existing technology, the present invention has at least one of the following technical effects.

The present invention adopts a pyramid network and decoupled detection structure aimed at solving common problems in remote sensing image detection such as complex and variable background, large target scale variation, inconsistent imaging quality, and a large number of similar objects interference, etc. This method can better extract and fuse multi-scale features, improve the recognition ability of small targets, and maintain high accuracy and fast response in the process of image processing and target positioning.

BRIEF DESCRIPTION OF THE DRAWINGS

To clearly illustrate the technical solutions of the embodiments of this invention, a simple introduction to the figures used in the description of the embodiments is provided below.

DETAILED DESCRIPTION

Figure 1:
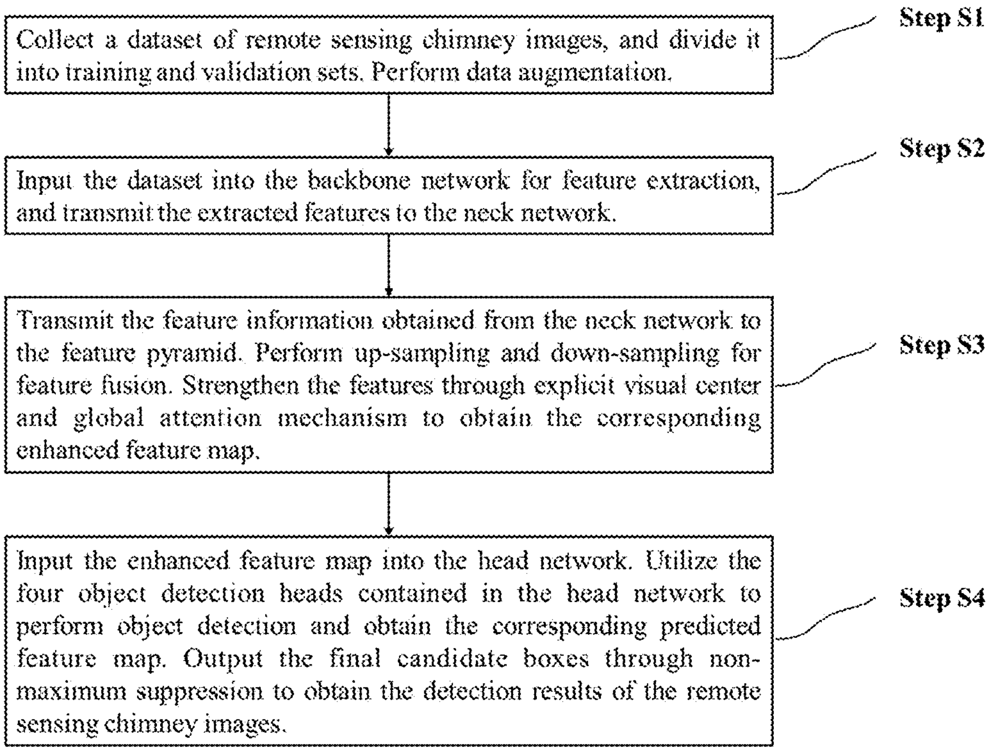
FIG. 1 is a flowchart of the steps in the chimney detection method based on AI technology in this invention.

To make the objectives, technical solutions, and advantages of the embodiments of this application clearer, the following will provide a detailed description of a chimney detection method based on You Only Look Once-Remote Sensing Object Detection (YOLO-RSOD) provided by this invention, combined with the figures in the embodiments. This embodiment is implemented under the premise of the technical solution of this invention, providing a detailed implementation method and specific operation process.

Embodiment 1

Remote sensing image object detection has important applications in fields such as environmental monitoring and resource exploration analysis. However, the current general-purpose target detection algorithms face some challenges when processing industrial chimney remote sensing images, such as complex and variable backgrounds, large changes in target size, uneven imaging quality, and a large number of similar objects causing false positives and false negatives. These problems generally result in low detection accuracy. For example, ① remote sensing images usually contain a large number of natural and man-made elements, the background is extremely complex, industrial areas, buildings, trees, etc. may affect the visibility of the chimney, making it difficult to distinguish the target from the background. ② The relative size of the chimney in the remote sensing image is small, which means that in high-resolution images, the chimney may only be a few pixels in size, making it difficult for traditional target detection algorithms to accurately identify and locate. ③ There are often a large number of structures similar to chimneys in industrial areas, such as exhaust pipes, pillars, etc. These similar objects are prone to misjudgment of the detection algorithm, reducing detection accuracy. ④ The target scale changes greatly in remote sensing images, the chimney may be mixed with other targets, or even partially occluded. This multi-scale feature increases the difficulty of detection, especially for those algorithms that cannot flexibly adjust the receptive field. ⑥ The quality and resolution of remote sensing images may be inconsistent. This will affect the clarity of the target, making it difficult for the detection algorithm to extract effective features, further leading to a decrease in detection accuracy.

In response to these problems, this invention proposes a high-efficiency, low-complexity anchor-free remote sensing image detection framework based on YOLOv7—YOLO-RSOD. By introducing additional remote sensing image detection heads, small object data prediction, decoupled detection head structure, centralized feature pyramid network explicit visual center, and global attention mechanism and other series of improvements, this framework has made significant progress in dealing with complex backgrounds, detecting small targets and overcoming similar object interference, effectively overcoming the challenges in existing technology, improving the accuracy and efficiency of remote sensing image object detection, and further data enhancement and optimization of the model structure. The specific implementation process is as follows.

Figure 2:
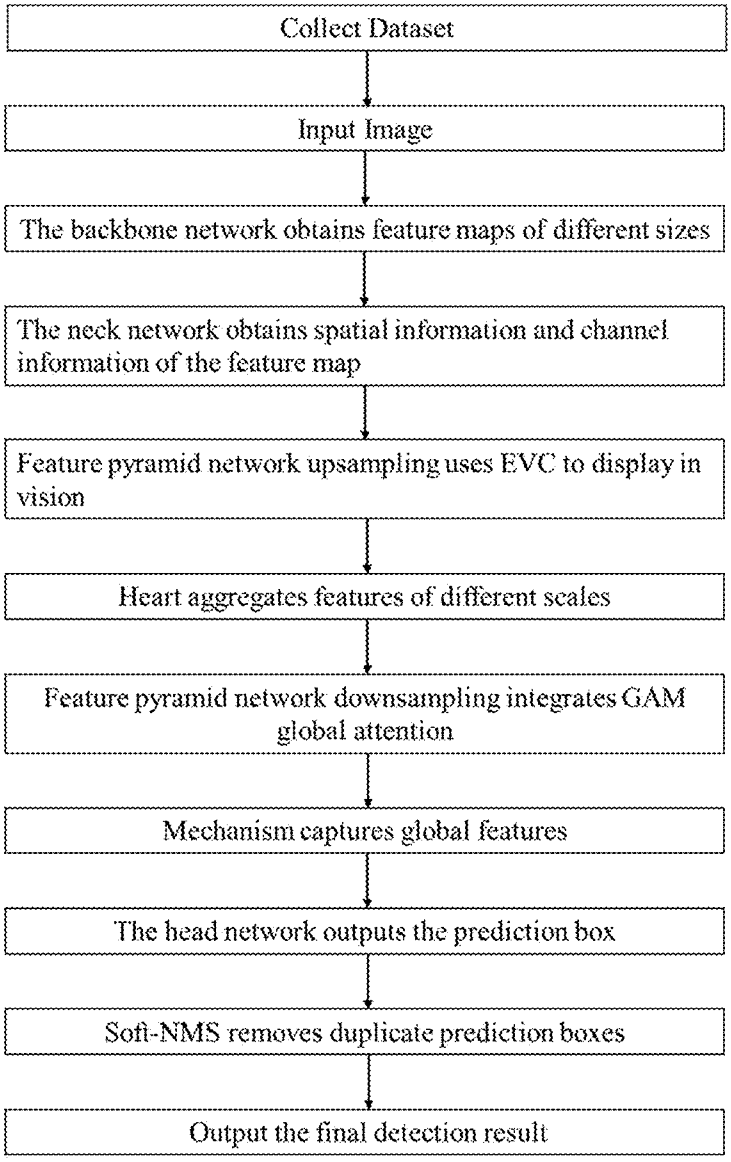
FIG. 2 is a detailed flowchart of the steps in the chimney detection method based on AI technology in this invention.
Figure 3:
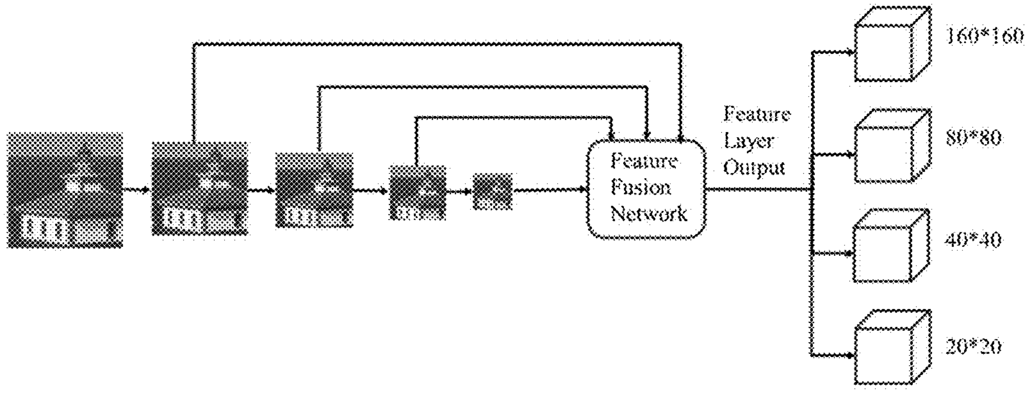
FIG. 3 is a schematic diagram of the small target detection layer in the chimney detection method based on AI technology in this invention.

As shown in FIGS. 1, 2, and 3, the present invention provides a chimney detection method based on AI technology, using the YOLO-RSOD target detection model, which includes the backbone network, neck network, feature pyramid network, and head network, including the following steps.

Step S1, manually collect the remote sensing chimney image dataset, and divide the collected dataset into a training set and a validation set, and perform data enhancement. The specific operation steps are: find industrial chimneys through satellite images, and crop the image size; repeat the operation to collect enough datasets; use the LabelImg tool for annotation, generate corresponding picture labels; divide the dataset and corresponding picture labels into a training set and a validation set at a ratio of 8:2.

Step S2, after the dataset is enhanced, it is input into the backbone network of YOLO-RSOD for feature extraction. The backbone network is a network structure composed of eleven layers of CBS convolution network, ELAN gradient network, and MP downsampling convolution network, which respectively extract the fifth, seventh, ninth, and eleventh layer feature information of the backbone network to obtain four different sizes of feature maps. The specific operation steps are as follows:

(1) The backbone network receives the cropped and annotated remote sensing image input and performs feature extraction;

(2) The backbone network used by YOLO-RSOD performs convolution, pooling, and normalization operations on the input image; that is, it first uses four layers of CBS modules to convolve and enhance the features of the remote sensing image to enhance the feature expression ability; the enhanced remote sensing image is sequentially passed through three groups of ELAN and MP combination modules, and one layer of ELAN gradient module, to reduce the loss of feature information of the remote sensing image, increase the receptive field, and make the network learn more feature information;

(3) In step S202, feature information is extracted from the fifth, seventh, ninth, and eleventh layers of the backbone network, respectively, to obtain four different sizes of feature maps.

(4) The four different sizes of feature maps in step S203 are input into the neck network, and the neck network enhances its ability to express images through convolution operations on the input feature maps, extracting spatial information and channel information.

Step S3, the feature information obtained by the neck network, i.e., the spatial information and channel information of the feature map, is transmitted to the feature pyramid for up and down sampling for feature fusion. That is, feature fusion is carried out in two ways: from top to bottom and from bottom to top, to obtain four different sizes of enhanced feature maps. In the up-sampling part of the feature pyramid network, the Explicit Visual Center (EVC) is introduced, and at the same time, the GAM global attention mechanism is integrated into the ELAN-H gradient network in the down-sampling part of the feature pyramid network. The specific operations are as follows:

(1) Input the feature information of the four different sizes of feature maps generated by the neck network into the feature pyramid network;

(2) The feature pyramid network up-samples each size of the feature map. Among them, the Explicit Visual Center (EVC) enhances the top layer (the eleventh layer of the backbone network) feature map, and the Stem Block smooths the top layer feature map through 7×7 convolution, batch normalization, and activation function. The Explicit Visual Center mainly consists of two parallel connected blocks, namely the lightweight MLP module and the LVC module. The lightweight MLP module captures the global information of the top layer feature map, and the LVC module aggregates local area feature information.

Figure 4:
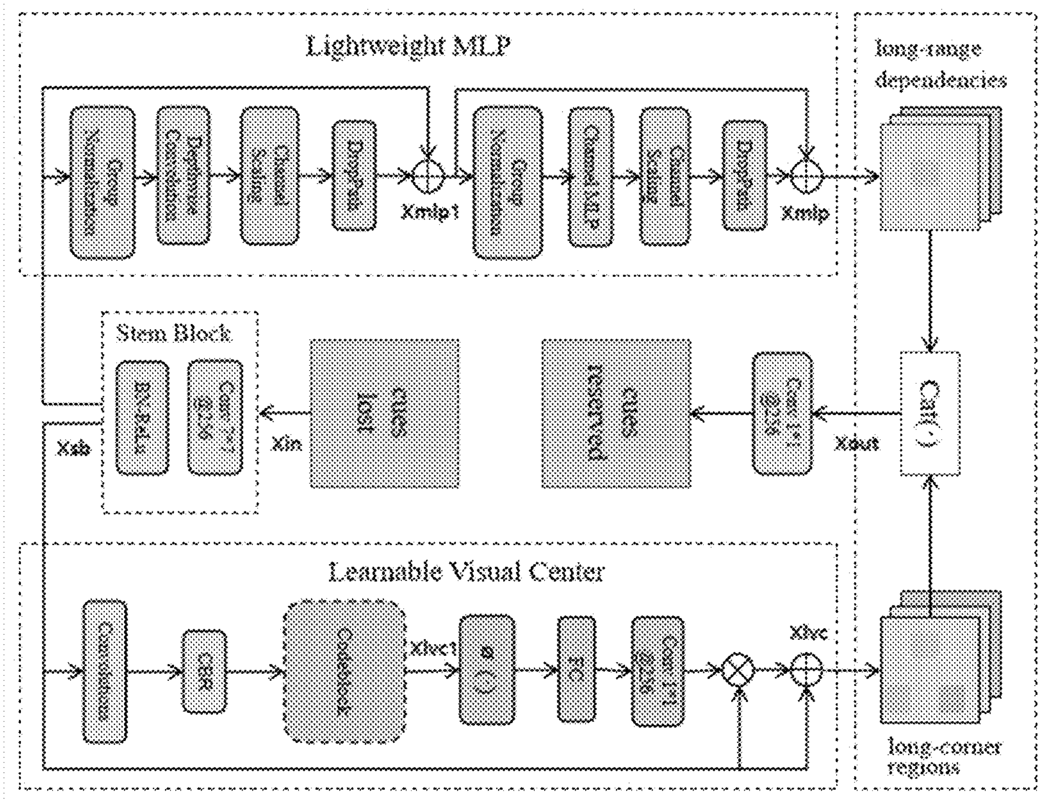
FIG. 4 is a flowchart of the EVC (Expected Visual Center) display in the chimney detection method based on AI technology in this invention.
Figure 6:
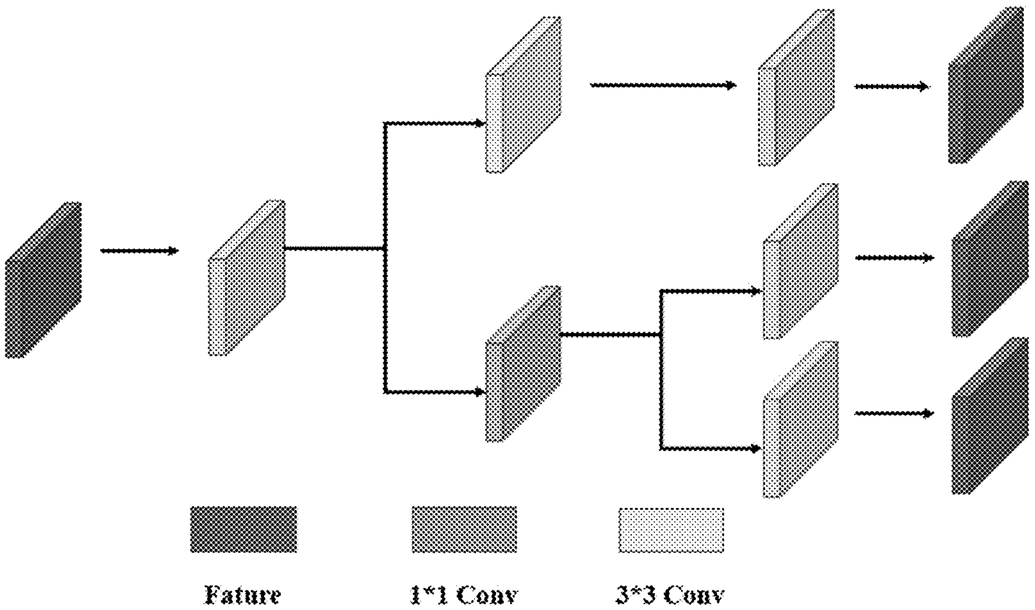
FIG. 6 is a structural diagram of the decoupled detection head in the chimney detection method based on AI technology in this invention.

The core block of Centralized Feature Pyramid (CFP), the Explicit Visual Center (EVC), is shown in FIG. 4. Between the top layer feature Xin and EVC, there is a Stem Block for feature smoothing. The Stem Block is composed of a 7×7 convolution with an output channel size of 256, followed by a batch normalization layer and an activation function layer. The above process can be represented by Xsb (full name) and the formula $Xsb=\sigma(BN(Conv7\times7\ (Xin)))$. As shown in FIGS. 4 and 6, the Explicit Visual Center specifically enhances the top layer (the eleventh layer of the backbone network) feature map as follows:

(1) The lightweight MLP mainly consists of two residual modules: a module based on depth convolution and a block based on channel MLP, where the input of the MLP module is the output of the depth convolution module. Specifically, for the module based on depth convolution, the feature Xsb output from the Stem-Block module is first processed by group normalization, then fed into the depth convolution layer, and then a residual connection is made;

(2) For the module based on channel MLP, the feature output from the depth convolution module Xmlp1 is first fed into group normalization, and then channel MLP is implemented on these features. Then, channel scaling, DropPath, and Xmlp1 residual connection are performed in sequence;

(3) In the LVC module, the features of Xsb are first encoded by a combination of a group of convolution layers (which consist of 1×1 convolution, 3×3 convolution, and 1×1 convolution). Then, the encoded features are processed by the CBR block, which consists of a 3×3 convolution with a BN layer and a ReLU activation function. Then, the encoded features are input into the CodeBlock, and the Code Block is used to obtain the correspondence between pixel points and position information;

(4) After obtaining the output of the Code Block, Xlvc1 is further fed into the fully connected layer and the 1×1 convolution layer to predict the features of the key classes. Then, Xsb and the scale factor coefficient $\delta(\cdot)$ are multiplied by channel. Finally, a channel addition is performed between its output and Xsb; and (5) The result feature maps of the MLP module and the LVC module are connected along the channel dimension to form the final output Xout of EVC, so that the feature pyramid network introduces centralized information during the up-sampling process, thereby achieving efficient feature fusion.

Figure 5:
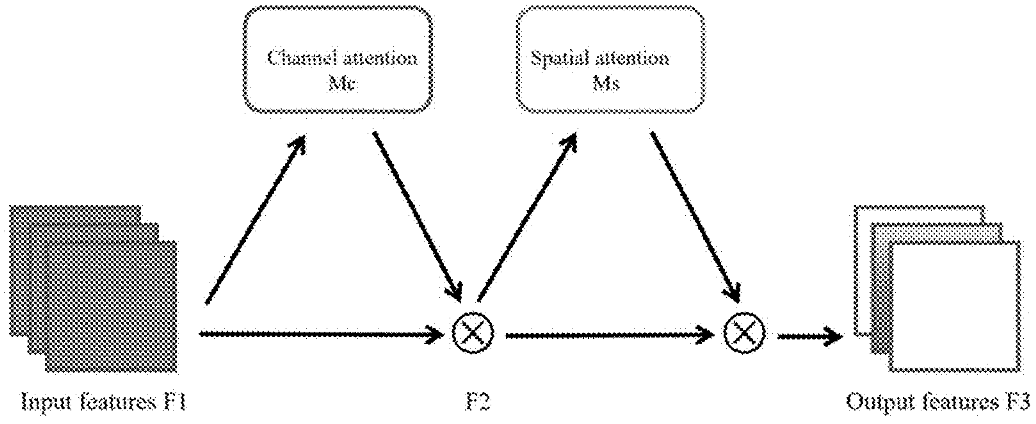
FIG. 5 is a structural diagram of the GAM (Global Attention Mechanism) in the chimney detection method based on AI technology in this invention.

In Step S33, during the down-sampling process, for the transmitted feature map, the global attention mechanism is used to focus on key areas, and the MP module is used for feature fusion, as shown in FIG. 5. The specific operations are as follows:

(1) Channel attention processing, for the transmitted feature map F1, the channel attention mechanism Mc of the global attention mechanism is used for processing, and the processed result is concatenated with the feature map F1 to obtain the intermediate state F2; and (2) Spatial attention processing, the intermediate state F2 is input into the spatial attention mechanism of the global attention mechanism, and the result is concatenated with the intermediate state F2 to obtain the final output F3.

In Step S4, the enhanced feature maps are input into the head network respectively, and the four decoupled target detection heads contained in the head network are used for target detection to obtain the corresponding predicted feature maps, and the final candidate boxes are output through non-maximum suppression to obtain the detection results of the remote sensing chimney images. The specific operations are as follows:

In the head network, four decoupled target detection heads are set, so that each decoupled target detection head detects different sizes of enhanced feature maps; the enhanced feature maps are input into the corresponding decoupled target detection head for target detection; the four decoupled target detection heads will perform multi-size prediction on the enhanced feature maps of different levels to obtain the corresponding predicted feature maps; the predicted feature maps output the predicted information of the bounding box, the predicted information includes the center horizontal and vertical coordinates, width, height offset, bounding box confidence and category confidence. Filter out the bounding boxes in the predicted feature map whose bounding box confidence is lower than the set threshold; use the Soft-NMS algorithm for bounding box management, the formula is:

$$S_i' = S_i e \frac{iou(M, b_i)^2}{\sigma},$$

$\forall b_i \notin D$; where, Si' is the adjusted bounding box confidence, IoU(bi, M) is the intersection over union of the current bounding box bi and the highest scoring bounding box M, Si represents the initial value of the current bounding box confidence, D is the target box set; $\sigma$ is the penalty factor, the value is (0,1); the adjusted bounding boxes are sorted in descending order according to the bounding box confidence, and start traversing from the highest scoring bounding box, calculate the overlap degree for the current bounding box and the already traversed bounding box, and reduce the bounding box confidence of the current bounding box according to the overlap degree and a preset reduction rate; until all bounding boxes are traversed; the position information of the bounding box is restored to the original image size, and the detection result is output.

Although this invention has been disclosed as above in its preferred embodiment, it is not intended to limit the invention. Any technician in this field, without departing from the spirit and scope of this invention, can make possible changes and modifications to the technical solution of this invention using the methods and technical content disclosed above. Therefore, any simple modification, equivalent change, and modification made to the above embodiments according to the technical essence of this invention, as long as they do not depart from the content of the technical solution of this invention, all fall within the protection scope of this invention's technical solution.

The invention claimed is:

1. A chimney detection method based on AI technology, comprising:

collecting a remote sensing chimney image dataset;

dividing the remote sensing chimney image dataset into a training set and a validation set and performing data augmentation;

inputting the remote sensing chimney image dataset into a backbone network for feature extraction and transmitting the remote sensing chimney image dataset to a neck network to extract feature information, which includes spatial information and channel information;

transmitting feature information obtained from the neck network to a feature pyramid;

performing up sampling and down sampling for feature fusion;

strengthening features through a explicit visual center and global attention mechanism to obtain a corresponding enhanced feature map;

inputting the corresponding enhanced feature map into a head network;

using four decoupled object detection heads included in the head network to perform object detection to obtain a corresponding predicted feature map; and outputting a final preselection box through non-maximum suppression to obtain a detection result of the remote sensing chimney image.

2. The chimney detection method according to claim 1, wherein said collecting a remote sensing chimney image dataset comprises:

obtaining remote sensing images of chimneys through satellite images to form the remote sensing chimney image dataset; and cropping each image and annotating the position and size of the chimney to generate corresponding picture labels, wherein the collected and annotated dataset are divided into the training set and the validation set at a ratio of 8:2.

3. The chimney detection method according to claim 2, wherein said inputting the remote sensing chimney image dataset into a backbone network comprises:

receiving the cropped and annotated remote sensing images as input and extracts features in the backbone network;

convolving the remote sensing images and enhance the features through a multi-layer convolution structure and an enhancement module, the enhancement module being a combination module of Efficient layer Aggregation Network (ELAN) and maximum pooling (MP); and extracting the feature information from a corresponding level of the backbone network to generate feature maps of different sizes.

4. The chimney detection method according to claim 3, wherein said transmitting the remote sensing chimney image dataset to a neck network to extract feature information includes inputting the feature maps of different sizes into the neck network, and wherein the neck network convolves the input feature maps and extracts the spatial information and the channel information.

5. The chimney detection method according to claim 4, wherein the feature maps of different sizes generated by the neck network are input into the feature pyramid network, wherein the feature pyramid network performs up sampling on the feature maps of each size, where the explicit visual center and Stem Block enhance and smooth the top-level feature map and the explicit visual center includes a lightweight Multi-Layer Perceptron (MLP) module and a Local Visual Center (LVC) module, and wherein, during the down sampling process, for the transmitted feature map, a key area is focused through a global attention mechanism, and the MP module is for feature fusion.

6. The chimney detection method according to claim 5, further comprising enhancing and smoothing a top-level feature map using Stem Block; said enhancing and smoothing comprising:

performing a 7×7 convolution layer operation on the top-level feature map;

performing a batch normalization layer on an output of the 7×7 convolution layer operation; and performing an activation function layer to enhance nonlinear processing capability.

7. The chimney detection method according to claim 6, wherein said performing up sampling on the feature maps of each size comprises:

enhancing feature representation based on the output feature Xsb of the Stem Block through group normalization and deep convolution processing and through residual connection using a lightweight MLP module;

encoding a feature Xsb using theLVC module, which uses a combination of 1×1, 3×3, 1×1 convolutions;

enchancing the feature Xsb through a Convolution-Batch Normalization-ReLu (CBR) block to obtain a corresponding relationship between a corresponding pixel point and position information; and summarizing output feature maps of the MLP module and the LVC module along a channel dimension to connect, to obtain a final output of the explicit visual center.

8. The chimney detection method according to claim 6, wherein during the down sampling process, a channel attention mechanism processes the input feature map and concatenates the input feature map with an original feature map to form an intermediate state, and wherein the intermediate state is processed through a spatial attention mechanism, the spatial information is enhanced through concatenation, and a final feature output is obtained, to enhance recognition ability of local spatial details.

9. The chimney detection method according to claim 8, further comprising:

setting and applying four decoupled object detection heads in the head network, wherein the decoupled object detection heads correspond to the enhanced feature maps of different sizes;

performing, using the four decoupled object detection heads, multi-size prediction on the enhanced feature maps of different levels;

generating the predicted feature map and outputting the prediction information containing the offset of the center coordinates, width, height, bounding box confidence, and category confidence.

10. The chimney detection method according to claim 9, wherein said outputting the final preselection box through non-maximum suppression comprises:

filtering out bounding boxes with confidence lower than the threshold;

optimizing a selection of the bounding box by calculating an intersection over union IoU and adjusting a confidence of the bounding box;

sorting and traversing the optimized bounding boxes according to confidence;

reducing the confidence of overlapping bounding boxes; and adjusting coordinates of the bounding box back to an original image size and output the final detection result.

* * * * *